United States Patent
Vats et al.

(10) Patent No.: US 9,354,879 B2
(45) Date of Patent: May 31, 2016

(54) SYSTEM AND METHOD FOR REGISTER RENAMING WITH REGISTER ASSIGNMENT BASED ON AN IMBALANCE IN FREE LIST BANKS

(75) Inventors: Suparn Vats, Fremont, CA (US); John H. Mylius, Gilroy, CA (US); Abhijit Radhakrishnan, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 640 days.

(21) Appl. No.: 13/541,351

(22) Filed: Jul. 3, 2012

(65) Prior Publication Data

US 2014/0013085 A1    Jan. 9, 2014

(51) Int. Cl.
*G06F 9/30* (2006.01)
*G06F 9/38* (2006.01)

(52) U.S. Cl.
CPC .............. *G06F 9/3012* (2013.01); *G06F 9/384* (2013.01)

(58) Field of Classification Search
CPC ....................................................... G06F 9/384
USPC ......................................................... 712/217
See application file for complete search history.

(56) References Cited

U.S. PATENT DOCUMENTS

| | | | |
|---|---|---|---|
| 5,978,898 A | 11/1999 | Hathaway et al. | |
| 6,314,511 B2 | 11/2001 | Levy et al. | |
| 7,373,486 B2 | 5/2008 | Lien et al. | |
| 2004/0133766 A1* | 7/2004 | Abraham et al. | 712/217 |
| 2005/0268075 A1* | 12/2005 | Caprioli et al. | 712/239 |
| 2008/0148022 A1 | 6/2008 | Piry et al. | |
| 2011/0099233 A1* | 4/2011 | Calder et al. | 709/206 |
| 2012/0005444 A1* | 1/2012 | Rupley et al. | 711/166 |

OTHER PUBLICATIONS

Seznec et al, Register Write Specialization Register Read Specialization: A Path to Complexity-Effecitve Wide-Issue Superscalar Processors, 2002, IEEE, 0-7695-1859-1/02, pp. 383-394,[retrieved from the internet on Oct. 28, 2014], URL <http://delivery.acm.org/10.1145/780000/774902/p383-seznec.pdf?ip=151.207.250.71&id=774902&acc=ACTIVE%20>.*

Wallace et al, A scalable register file architecture for dynamically scheduled processors, 1996, IEEE, 1089-795X/96 Proceedings of PACT '96, 7 pages, [retrieved from the internet on Oct. 28, 2014], retrieved from URL <http://ieeexplore.ieee.org/stamp/stamp.jsp?arnumber=552666>.*

(Continued)

*Primary Examiner* — Andrew Caldwell
*Assistant Examiner* — Jyoti Mehta
(74) *Attorney, Agent, or Firm* — Rory D. Rankin; Meyertons, Hood, Kivlin, Kowert & Goetzel, P.C.

(57) ABSTRACT

A free list in processor includes multiple banks for indicating availability of register identifiers used for register renaming. A register rename unit receives one or more destination architectural registers to rename with physical register identifiers. Responsive to determining the multiple banks within the free list are unbalanced with available physical register identifiers, one or more returning physical register identifiers are assigned to the destination architectural registers before assigning any physical register identifiers from any bank of the multiple banks with a lowest number of available physical register identifiers. A returning physical register identifier is a physical register identifier that is available again for assignment to a destination architectural register but not yet indicated in the free list as available. Each of the banks includes a single bit width decoded vector for indicating availability of given physical register identifiers.

20 Claims, 5 Drawing Sheets

(56) References Cited

OTHER PUBLICATIONS

Andrew S Tannenbaum, Structured Computer Organization, 1984, Prentice-Hall, Second edition, pp. 10-12.*

José L. Ayala; Marisa LópezVallejo; Alexander Veidenbaum "A Compiler-Assisted Banked Register File Architecture" downloaded from www.dacya.ucm.es/jlayala/Publications_files/WASP04.pdf available Dec. 13, 2009.

* cited by examiner

SYSTEM AND METHOD FOR REGISTER RENAMING WITH REGISTER ASSIGNMENT BASED ON AN IMBALANCE IN FREE LIST BANKS

BACKGROUND OF THE INVENTION

1. Field of the Invention

This invention relates to microprocessors, and more particularly, to efficiently reducing the latency and power of register renaming.

2. Description of the Relevant Art

Microprocessors typically include overlapping pipeline stages and out-of-order execution of instructions. Additionally, microprocessors may support simultaneous multi-threading to increase throughput. Microprocessor throughput may be measured by the useful execution of a number of instructions per thread for each stage of a pipeline. These techniques take advantage of instruction level parallelism (ILP) and may increase the throughput. However, these techniques generally add more hardware and more depth to a pipeline. In addition, control dependencies and data dependencies associated with such techniques may reduce a maximum throughput of the microprocessor.

Speculative execution of instructions is used to perform parallel execution of instructions despite control dependencies in the source code. In a software application, straight line code is a group of instructions without branches, loops, or tests that may be sequentially executed, although implemented hardware may perform out-of-order processing of instructions. Straight line code may also be referred to as a basic block of instructions. In straight line code, read after write (RAW), write after read (WAR) or write after write (WAW) dependencies may be encountered. Register renaming may be used to allow parallel execution of instructions despite the WAR and WAW dependencies. The execution techniques used to increase throughput may utilize a relatively large number of non-architectural registers which may be referred to as "physical registers".

Physical registers are typically used to store the state of intermediate results from instruction execution after eliminating false write after read (WAR) dependencies and re-ordering write after write (WAW) dependencies in the pipeline. A free list is used to keep track of which physical registers are not currently in use. These particular free physical registers are available for use by incoming instructions. As the number of physical registers increase, the number of storage elements used for the free list and for identifying recently retired physical register identifiers increases. Therefore, on-die real estate, clock signal loading, signal cross-capacitance, and as a result, power may increase for the maintenance of these physical registers.

In view of the above, methods and mechanisms for reducing the latency and power of register renaming are desired.

SUMMARY OF EMBODIMENTS

Systems and methods for reducing the latency and power of register renaming are contemplated. In various embodiments, a processor includes a register rename unit that receives decoded instructions. The decoded instructions include one or more destination architectural registers (ARs) for renaming. The processor may also include a free list, storing availability information corresponding to multiple physical registers (PR) used for register renaming. In some embodiments, the free list may comprise multiple banks. The register rename unit additionally receives one or more returning PR IDs. A returning PR ID is a PR ID that is available again for assignment to a destination AR but is not yet indicated in the free list as being available.

Control logic, which may be within the register rename unit, may determine that the multiple banks within the free list are unbalanced with available PR IDs. In response to this determination, the register rename unit may assign one or more returning PR IDs to the received one or more destination ARs before assigning any PR IDs from any bank of the multiple banks of available PR IDs. In various embodiments, selected banks within the multiple banks may not currently store availability information for the one or more of the assigned returning PR IDs. Therefore, the unbalanced banks may return to being balanced.

In various embodiments, each of the banks includes a single bit width decoded vector. Each bit indicates whether a given PR ID of the multiple PR IDs is available for renaming. The decoded vector may appreciably reduce a number of storage elements, an amount of clock loading, an amount of wire routing capacitance, and thereby an amount of power used for the free list. In various other embodiments, the register rename unit stalls the update of the free list with returning PR IDs in order to help regain balance among the banks. In yet other embodiments, the register rename unit stalls the update with returning PR IDs for banks that do not have the lowest number of available PR IDs. In contrast, the banks within the free list with the lowest number of available PR IDs may be updated with associated returning PR IDs.

These and other embodiments will be further appreciated upon reference to the following description and drawings.

Figure 1:
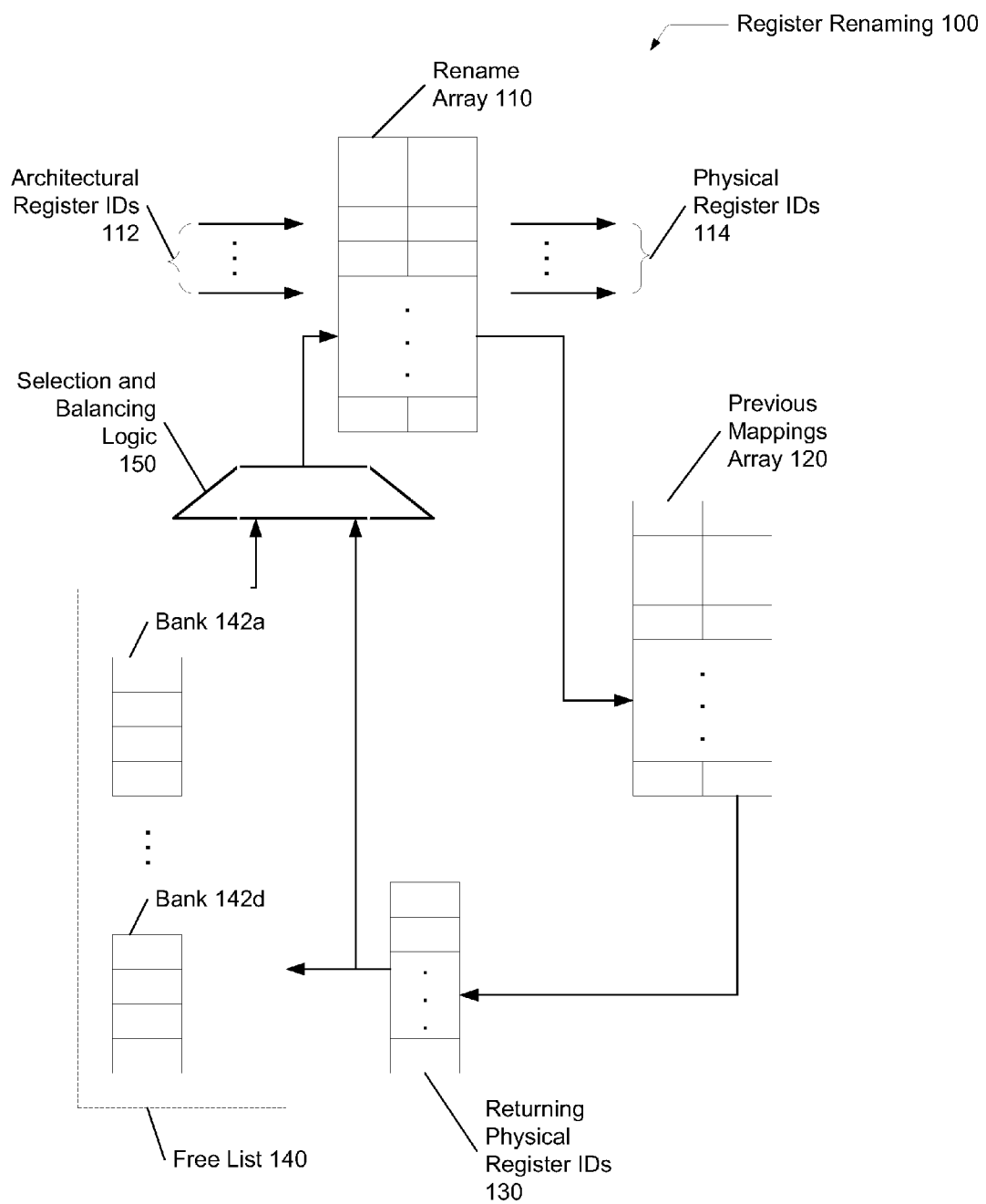
FIG. 1 is a generalized block diagram depicting one embodiment of register renaming.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six, interpretation for that unit/circuit/component.

DETAILED DESCRIPTION

In the following description, numerous specific details are set forth to provide a thorough understanding of the present invention. However, one having ordinary skill in the art should recognize that the invention might be practiced without these specific details. In some instances, well-known circuits, structures, and techniques have not been shown in detail to avoid obscuring the present invention.

As is well known to those skilled in the art, register renaming is used to remove register anti-dependencies and output-dependencies. Instructions within a software application indicate a particular type of processing occurs on one or more source operands and a generated result is placed in a destination operand. Both source and destination operands include an associated architectural register identifier (ID). The architectural register IDs are architecturally visible register IDs that a software programmer and/or a compiler may identify within the software application. The architecturally visible register IDs are associated with a given instruction set architecture (ISA). The generated result for an instruction is typically stored in a local physical register allocated for the instruction. The destination architectural register ID within the instruction also identifies this local physical register storing the generated result. Accordingly, younger dependent instructions may operate using the generated result.

Referring to FIG. 1, a generalized block diagram of one embodiment of register renaming 100 is shown. As shown, a rename array 110 stores mappings between architectural register identifiers (IDs) 112 and physical register IDs 114. The rename array 110 may also be referred to as a register allocation table or a register alias table. A mapping is a pairing of a given one of the architectural register identifiers IDs 112 with a given one of the physical register IDs 114. An architectural register ID may also be referred to as a logical register ID. A given source architectural register ID may be used to index into the rename array 110 in order to read out a corresponding physical register ID. Source architectural register IDs used to index into the rename array 110 may be received from decoded instructions.

Allocation or selection logic 150 may select an available physical register ID from the free list 140 to assign to a destination architectural register ID within a decoded instruction. The rename array 110 is updated with the selected mapping. The previous mappings array 120 is updated with the mapping stored in the rename array 110 and replaced with the selected mapping. The previous mappings array 120 stores previous mappings between pairs of architectural register IDs 112 and physical register IDs 114, whereas the rename array 110 stores the current or the most recent mappings selected by the selection logic 150. When a given one of the architectural register IDs is renamed, each subsequent instruction in-program-order accesses the new mapping stored in the rename array 110. Typically, previous mappings are not read by the subsequent instructions.

A subset of the physical register IDs stored in mappings within the previous mappings array 120 may be sent as returning physical register IDs 130 to a free list 140. In various embodiments, the returning physical register IDs 130 may be stored in a storage element and held for a period of time prior to being written into the free list 140. In other embodiments, the returning physical register IDs 130 are sent directly to the free list 140 with no staging. Generally speaking, the physical register IDs used in mappings may be reclaimed when these IDs cannot be referenced anymore. An example of this condition is when a given instruction retires, wherein the given instruction had previously caused a mapping including a given physical register ID to be removed from the rename array 110 and sent to the previous mappings array 120. When the given instruction retires, the given physical register ID of a previous mapping stored in the previous mappings array 120, if any, is reclaimed and sent to the free list 140.

Prior to being dispatched to a scheduler, decoded instructions have a corresponding destination architectural register identifier mapped to a physical register (PR) identifier (ID) from available PR IDs within the free list 140 and the returning PR IDs 130. The selection logic 150 determines which available PR ID to assign to a given destination architectural register (AR) ID. Although one free list is shown, in various embodiments multiple free lists may be used. For example, the type of an instruction may be used to select a PR ID from one free list of multiple free lists for register renaming. A separate free list may be used for renaming architectural register IDs corresponding to at least the following instruction types: integer, single instruction multiple data (SIMD), and status.

The status registers updated by status instruction types store the current process state of the processor. The status registers may also be referred to as flag registers or condition code registers. Examples of status or flag information stored in these registers include a carry flag, a zero flag, a parity flag, an overflow flag, a trap flag, and so forth. Each of the SIMD and status types may be further divided into a high portion and a low portion. For SIMD instruction types, a portion may have a size of a double word. For status instruction types, a portion may have a size of a word or a half word. Each of the SIMD portions and status portions may have a corresponding free list.

The free list 140 includes multiple banks 142a-142d. In various embodiments, each one of the banks 142a-142d includes a same number of initial available PR IDs. For example, the free list 140 may be initialized with 144 available PR IDs. The free list may include 3 banks, each bank comprising an initial number of 48 available PR IDs. In other embodiments, each one of the banks 142a-142d includes a similar number of initial available PR IDs. For example, a free list may be initialized with 64 available PR IDs. The free list may include 3 banks, wherein 2 banks comprise an initial number of 22 available PR IDs and the $3^{rd}$ bank comprises an initial number of 20 available PR IDs.

Dividing the free list 140 into multiple banks 142a-142d may allow for quicker selection and assignment of multiple PR IDs per clock cycle to incoming decoded instructions than having one pool of available PR IDs. The partitioning of the free list 140 into multiple banks 142a-142d allows for a smaller search space and may simplify search logic. Additionally, each one of the banks 142a-142d may be implemented as a single bit width decoded vector, rather than a table of encoded IDs. In one embodiment, an asserted given bit within a bank's decoded vector indicates a corresponding PR ID is available for use by a received decoded instruction. A de-asserted bit may indicate the corresponding PR ID is unavailable for selection as it is already in use by an instruction being processed in the processor's pipeline. When the given bit is asserted and selected for use, the bit position within the decoded vector may be encoded to generate the corresponding PR ID to rename a destination architectural register ID. Further details are provided shortly.

Figure 2:
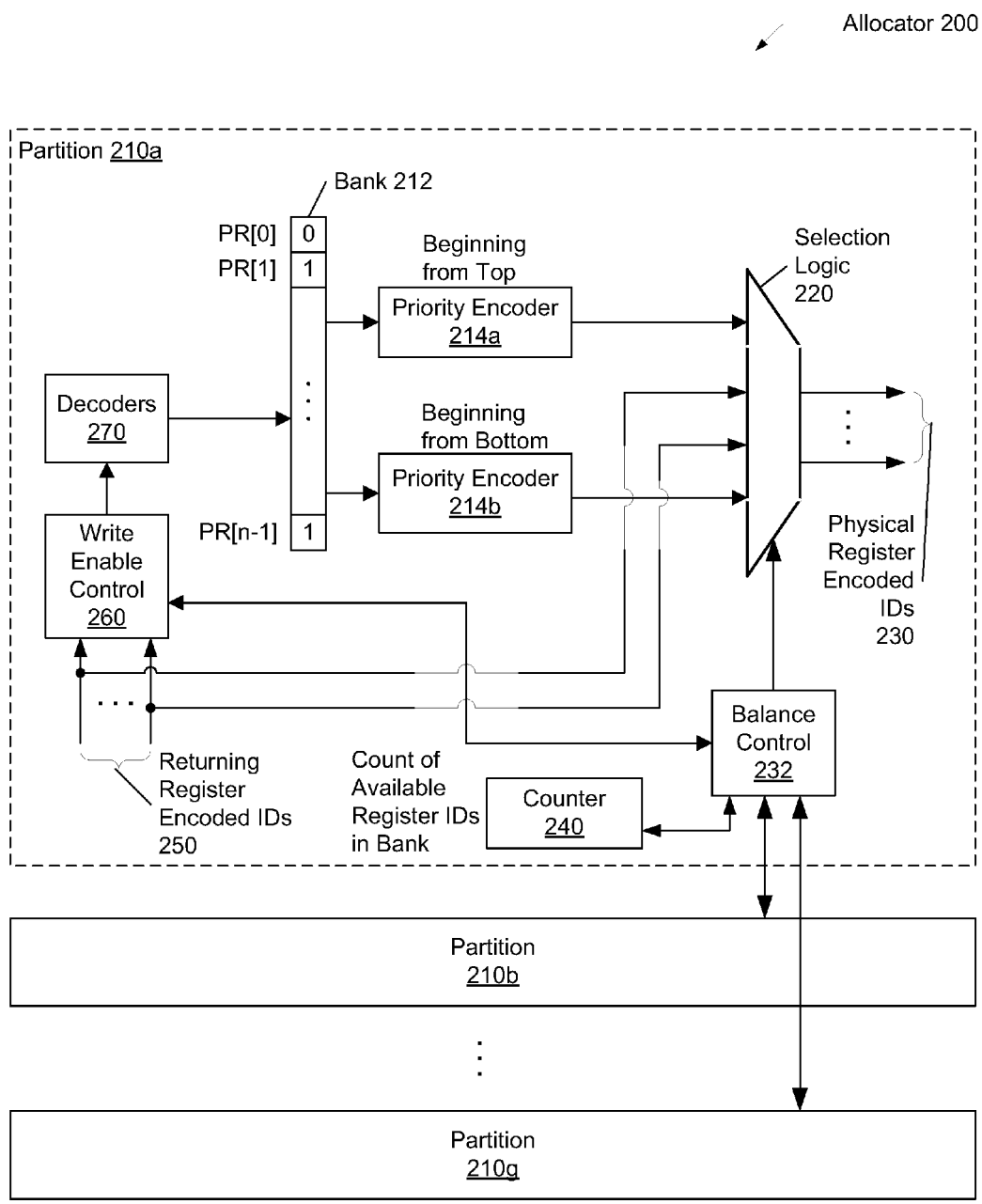
FIG. 2 is a generalized block diagram of one embodiment of allocation of register identifiers.

Referring now to FIG. 2, a generalized block diagram illustrating one embodiment of an allocator 200 that allocates physical register IDs for register renaming is shown. In various embodiments, the components within the allocator 200 may be located within a register rename unit. In other embodiments, the components may be located across different functional blocks, such as the register rename unit, a mapper, and so forth.

In one embodiment, the allocator 200 includes multiple partitions 210a-210g. Each one of the partitions 210a-210g may include a bank 212 for storing availability information corresponding to a subset of PR IDs within a free list. In various embodiments, each one of the partitions 210a-210g stores availability information within a respective bank 212 for a same number of initial available PR IDs. For the earlier example of a free list initialized with 144 available PR IDs and includes three banks, the allocator 200 may include three partitions. Within each of the three partitions, a bank 212 may store availability information for 48 PR IDs.

In other embodiments, a bank 212 within each one of the partitions 210a-210g stores availability information for a similar number of initial available PR IDs as other partitions. For the earlier example of a free list initialized with 64 available PR IDs and includes three banks, the allocator 200 may include three partitions. Within two of the three partitions, a bank 212 may store availability information for 22 PR IDs. Within one of the three partitions, a bank 212 may store availability information for 20 PR IDs.

In some embodiments, the bank 212 may be implemented as a single bit width decoded vector, rather than a table of encoded IDs. A number of storage elements used to store availability information for the PR IDs in the bank 212 may be greatly reduced. For example, three free lists, each with 144 initial available PR IDs, utilize an 8-bit encoded PR ID. Therefore, 3,456 (3×144×8) storage elements may be used to hold the encoded IDs within the free lists. However, with a decoded vector, 432 (3×144×1) storage elements may be used to hold the availability information for the PR IDs. In one embodiment, an asserted given bit within a bank's decoded vector indicates a corresponding PR ID is available for use by a received decoded instruction. A de-asserted bit may indicate the corresponding PR ID is unavailable for selection as it is already in use by an instruction being processed in the processor's pipeline.

As shown, two priority encoders 214a-214b are used to search the bank 212 for available PR IDs. One priority encoder may begin searching the bank 212 from the top and a second priority encoder may begin searching the bank 212 from the bottom. Although two priority encoders are shown, a different number of priority encoders used for searching the bank 212 for available PR IDs is possible and contemplated. By dividing the free list into multiple banks, the search logic that includes the priority encoders 214a-214b may be simplified. Using the above example, the selection logic including the priority encoders 214a-214b search the bank 212 corresponding to 48 PR IDs per partition, rather than search 144 PR IDs within the entire free list.

In addition, the partitioning reduces the number of PR IDs to select and assign for register renaming from a total number of PR IDs for the entire free list. Continuing with the above example, if the allocator 200 is designed to provide a maximum of 6 PR IDs to incoming decoded instructions per clock cycle, and the allocator 200 includes three partitions, then the partitioned selection logic including the priority encoders 214a-214b and the selection logic 220 may provide 2 PR IDs. These 2 PR IDs may be provided on the output lines 230.

Both dividing the free list into multiple banks where each one of the partitions 210a-210g has a bank 212 and selecting a fixed number of PR IDs from each bank 212 within a given one of the partitions 210a-210g may cause a bottleneck condition. The out-of-order execution implementation of a processor may cause PR IDs to be freed and returned for reuse in an unbalanced manner in relation to the banks within the partitions 210a-210g. The banks within the partitions 210a-210g may be determined to be unbalanced in response to detecting at least one bank has a number of available PR IDs different by a given threshold from another number of available PR IDs within one or more other banks of the multiple banks. For example, if the given threshold is 15, then the banks within the partitions 210a-210g are determined to be unbalanced when a first bank and a second bank differ by at least 15 in the number of available PR IDs these banks currently store. The returning physical register (PR) encoded IDs 250 represent the returning PR IDs. The returning PR encoded IDs 250 may be staged prior to being received by a respective one of the partitions 210a-210g. Alternatively, the returning PR encoded IDs 250 may be staged in storage elements (not shown) within a respective one of the partitions 210a-210g. The write enable control logic 260 may enable when the bank 212 is updated with availability information. The decoders 270 may select a corresponding bit of the multiple bits within the bank 212 for an update of availability. The returning PR encoded IDs 250 are returned for reuse and sent to a respective one of the partitions 210a-210g to be written into a respective bank. Therefore, an imbalance of a number of available PR IDs across the partitions 210a-210g may occur.

As a number of available PR IDs within a given one of the partitions 210a-210g continues to decrease, the number may fall below a number of PR IDs the selection logic 220 is to provide per partition. In the earlier example with a maximum of 6 PR IDs to provide to incoming decoded instructions per clock cycle and with three partitions, the selection logic 220 within a given one of the partitions 210a-210g is to provide 2 PR IDs per clock cycle. In other embodiments, the number of PR IDs to provide to incoming decoded instructions per clock cycle may be a different value than 2. Continuing with the example, if the number of available PR IDs within the bank 212 falls below 2, then a pipeline stall may be inserted in the pipeline. Therefore, even if a number of available PR IDs across the three partitions is 6 or more, which would be a sufficient amount to service the received decoded instructions in a rename group, a free list stall may still occur. Further, even when the number of PR IDs for a rename group in a given clock cycle is less than 6, the pipeline stall may still occur when any one of the three partitions has less than 2 available PR IDs.

The balance control logic 232 attempts to maintain a balance of a number of available PR IDs across the banks within the partitions 210a-210g. The counter 240 may keep track of the number of available PR IDs within the bank 212. Maintaining balance across the banks within the partitions 210a-210g may prevent any one of the banks within the partitions 210a-210g to have a number of available PR IDs fall to a value that causes pipeline stalls. To maintain balance, the balance control logic 232 may prioritize assigning available PR IDs to the received destination ARs IDs from any bank of the multiple banks across the partitions 210a-210g with a highest number of available PR IDs.

Additionally, in place of selecting available PR IDs from any bank of the multiple banks across the partitions 210a-

210g with a lowest number of available PR IDs, the balance control logic 232 may select one or more of the returning PR encoded IDs 250 from any bank of the multiple banks across the partitions 210a-210g with a highest number of available PR IDs. If no returning PR encoded IDs 250 are available from any bank of the multiple banks across the partitions 210a-210g with a highest number of available PR IDs, then the balance control logic 232 may select one or more of the returning PR encoded IDs 250 from any bank of the multiple banks across the partitions 210a-210g that is not a bank with a lowest number of available PR IDs. The selected one or more of the returning PR encoded IDs 250 are immediately reused, or bypassed, in order not to further deplete any bank of the multiple banks across the partitions 210a-210g with a lowest number of available PR IDs relative to other banks. In some embodiments, when the returning PR encoded IDs 250 are not used for bypassing, they are decoded and written into a respective entry within the bank 212. In other embodiments, when the returning PR encoded IDs 250 are not used for bypassing, they may be staged or held in storage for one or more cycles in order to be candidates for bypassing in later cycles.

Figure 3:
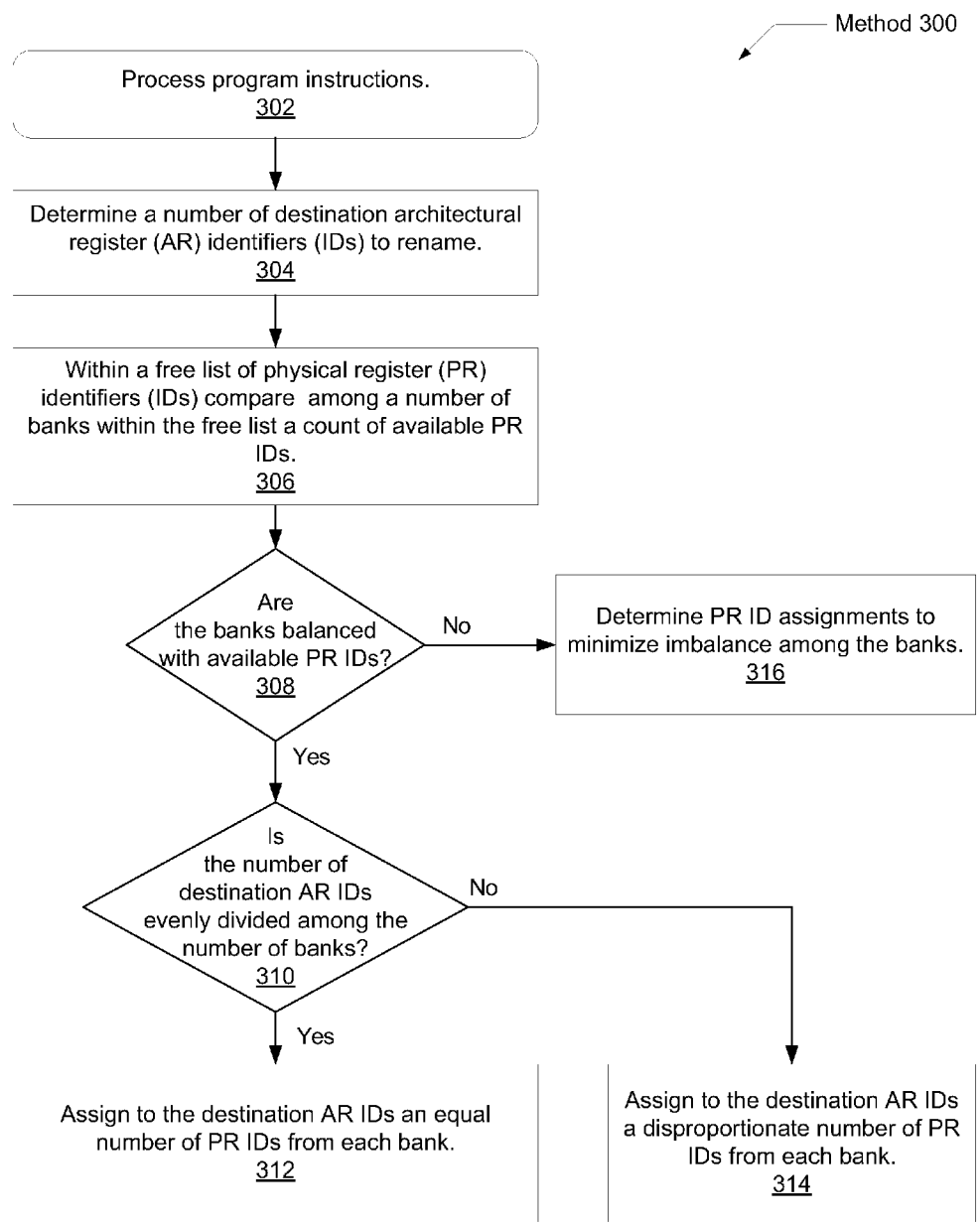
FIG. 3 is a generalized flow diagram of one embodiment of a method for register renaming.

Referring now to FIG. 3, a generalized flow diagram of one embodiment of a method 300 for register renaming is shown. In block 302, program instructions are processed. The instructions may be compiled, fetched from memory, decoded and executed, and committed. After decoding, the architectural register identifiers (IDs) used for the source operands and the destination operands are ready to be renamed. In block 304, a number is determined of destination architectural register (AR) identifiers (IDs) to rename. As described in the earlier example, a maximum number of destination AR IDs to rename may be 6. However, in a given clock cycle, the number of destination AR IDs to rename may be less than the maximum number.

In block 306, within a free list of physical register (PR) identifiers (IDs) that includes multiple banks, a count of available PR IDs is compared among the multiple banks within the free list. For example, referring again to FIG. 2, the counter 240 may have its output compared to the output of counters in other partitions of the partitions 210a-210g. Returning to FIG. 3, if the banks within the free list are balanced with available PR IDs (conditional block 308), then the number of destination AR IDs to rename may be compared to the number of banks within the free list.

If the number of destination AR IDs to rename is evenly divided among the number of banks (conditional block 310), then in block 312, an equal number of PR IDs from each bank may be assigned to the destination AR IDs. For example, if there are 6 destination AR IDs to rename and there are 3 banks, then 2 PR IDs from each of the banks may be used for register renaming.

If the number of destination AR IDs to rename is not evenly divided among the number of banks (conditional block 310), then in block 314, a disproportionate number of PR IDs from each bank may be assigned to the destination AR IDs. For example, if there are 4 destination AR IDs to rename and there are 3 banks, then 2 PR IDs from each of two banks may be used for register renaming while the third bank is not used. Therefore, the three banks are beginning to become unbalanced.

If the banks within the free list are not balanced with available PR IDs (conditional block 308), then in block 316, the PR ID assignments to the received destination AR IDs are performed in a manner to minimize imbalance among the banks. In this case, balance control logic may prioritize assigning available PR IDs to the received destination ARs IDs from any bank of the multiple banks with a highest number of available PR IDs. In addition, balance control logic may prioritize assigning available returning PR IDs to the received destination ARs IDs prior to assigning PR IDs from any bank of the multiple banks with a lowest number of available PR IDs. A returning PR ID is a PR ID that was in use for register renaming, but is available again for assignment to a destination AR. Additionally, the returning PR ID is not yet indicated in a free list as available. Further details are provided below.

Figure 4:
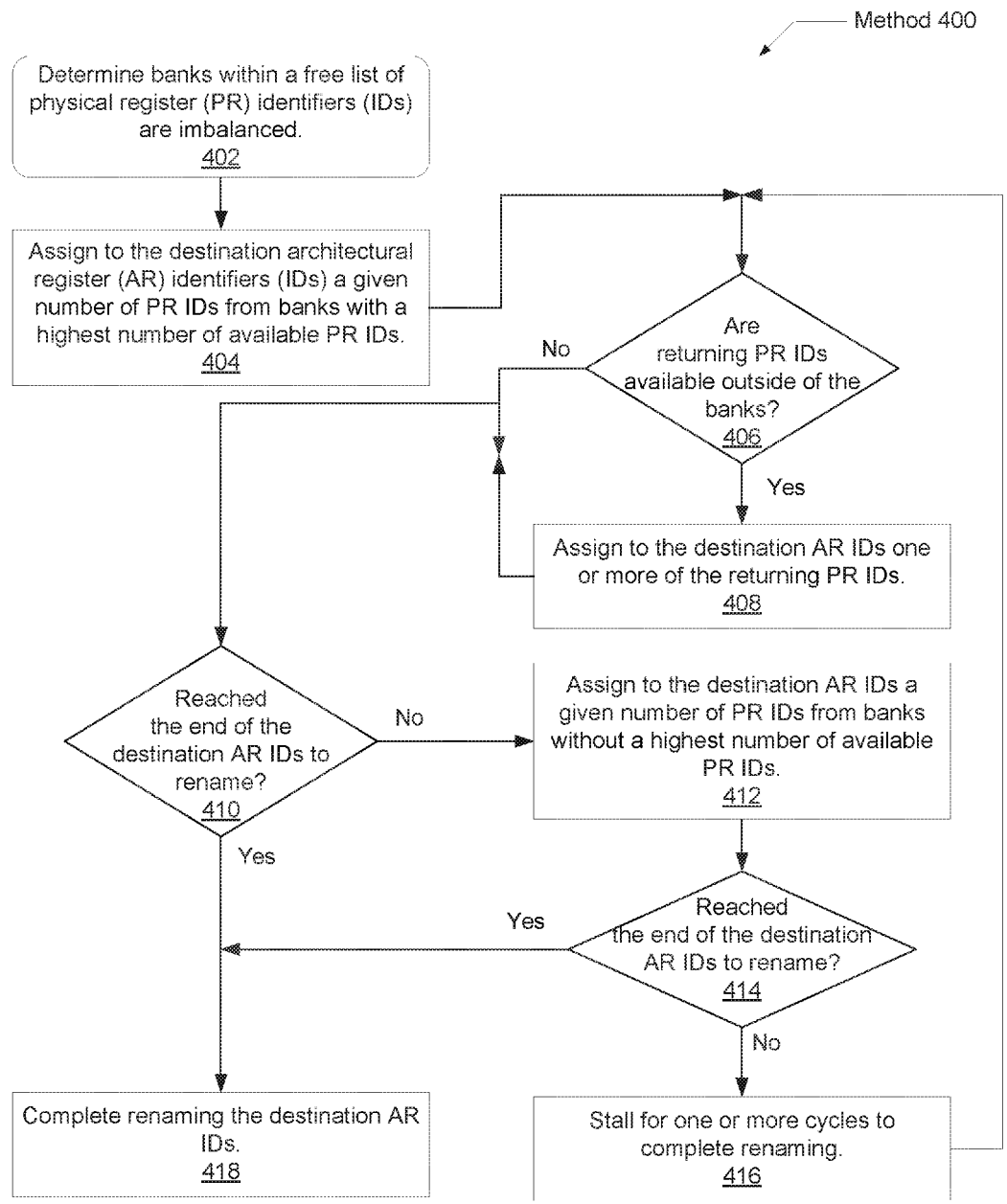
FIG. 4 is a generalized flow diagram of one embodiment of a method for using a free list.

Referring now to FIG. 4, a generalized flow diagram of one embodiment of a method 400 for minimizing imbalance among multiple banks within a free list during register renaming is shown. In block 402, it is determined multiple banks within a free list of physical register (PR) identifiers (IDs) are imbalanced. One or more of the multiple banks have a different number of available PR IDs than other banks. In some embodiments, the difference in the number of available PR IDs may be greater than a given threshold in order to qualify the multiple banks as being imbalanced. In block 404, a given number of PR IDs from banks with the most available PR IDs are assigned to destination architectural register (AR) identifiers (IDs) that are received for register renaming.

A returning PR ID is a PR ID that was in use for register renaming, but is available again for assignment to a destination AR ID. Additionally, the returning PR ID is not yet indicated in a free list as available. In some embodiments, a returning PR ID is sent to a given one of the multiple banks based on its encoded ID value. The returning PR ID may be stored and held for one or more clock cycles prior to being sent to a corresponding bank for updating associated availability information. The number of clock cycles to hold the returning PR ID may be a given fixed number. Alternatively, the number of clock cycles to hold the returning PR ID may depend on which bank of the multiple banks is associated with the returning PR ID and whether the multiple banks are imbalanced. For example, returning PR IDs associated with any bank of the multiple banks with a lowest number of available PR IDs may have priority over other returning PR IDs to update the free list. Returning PR IDs associated with any bank of the multiple banks with a highest number of available PR IDs may have priority over other returning PR IDs to bypass updating the free list and be assigned to destination AR IDs. These returning PR IDs may bypass updating the free list and be used for register renaming in place of available PR IDs in any bank of the multiple banks with a lowest number of available PR IDs.

If there are returning PR IDs available outside of the banks (conditional block 406), then in block 408, one or more of the returning PR IDs is assigned to destination AR IDs that are received for register renaming. Examples of the priorities for using the returning PR IDs are described above. Depending on the number of received destination AR IDs in a given clock cycle, the combined number of the selected returning PR IDs for renaming as described in block 408 and the number of available PR IDs from any bank of the multiple banks with a highest number of available PR IDs for renaming as described in block 404 may be sufficient for renaming all received destination AR IDs. Similarly, the number of available PR IDs from any bank of the multiple banks with a highest number of available PR IDs for renaming may be sufficient for renaming all received destination AR IDs if the number of received destination AR IDs is relatively small.

If the end of the received destination AR IDs to rename is reached (conditional block 410), then in block 418, register renaming for the received destination AR IDs is completed. Otherwise, in block 412, a given number of PR IDs from banks without a highest number of available PR IDs is assigned to the destination AR IDs that have not yet been renamed. In some embodiments, the banks with a number of available PR IDs between the highest number and the lowest number of available PR IDs may be used for renaming prior to using returning PR IDs that may bypass the free list. In other embodiments, these particular banks may be used for renaming after using the returning PR IDs that may bypass the free list. In each case, the returning PR IDs that may bypass the free list may have priority for being used during renaming over accessing any bank of the multiple banks with the lowest number of available PR IDs.

If the end of the received destination AR IDs to rename is reached (conditional block 414), then in block 418, register renaming for the received destination AR IDs is completed. Otherwise, in block 416, a pipeline stall of one or more cycles may be inserted into the pipeline. The pipeline stall may allow the banks to be updated with returning PR IDs and increase a respective number of available PR IDs to use for renaming.

Figure 5:
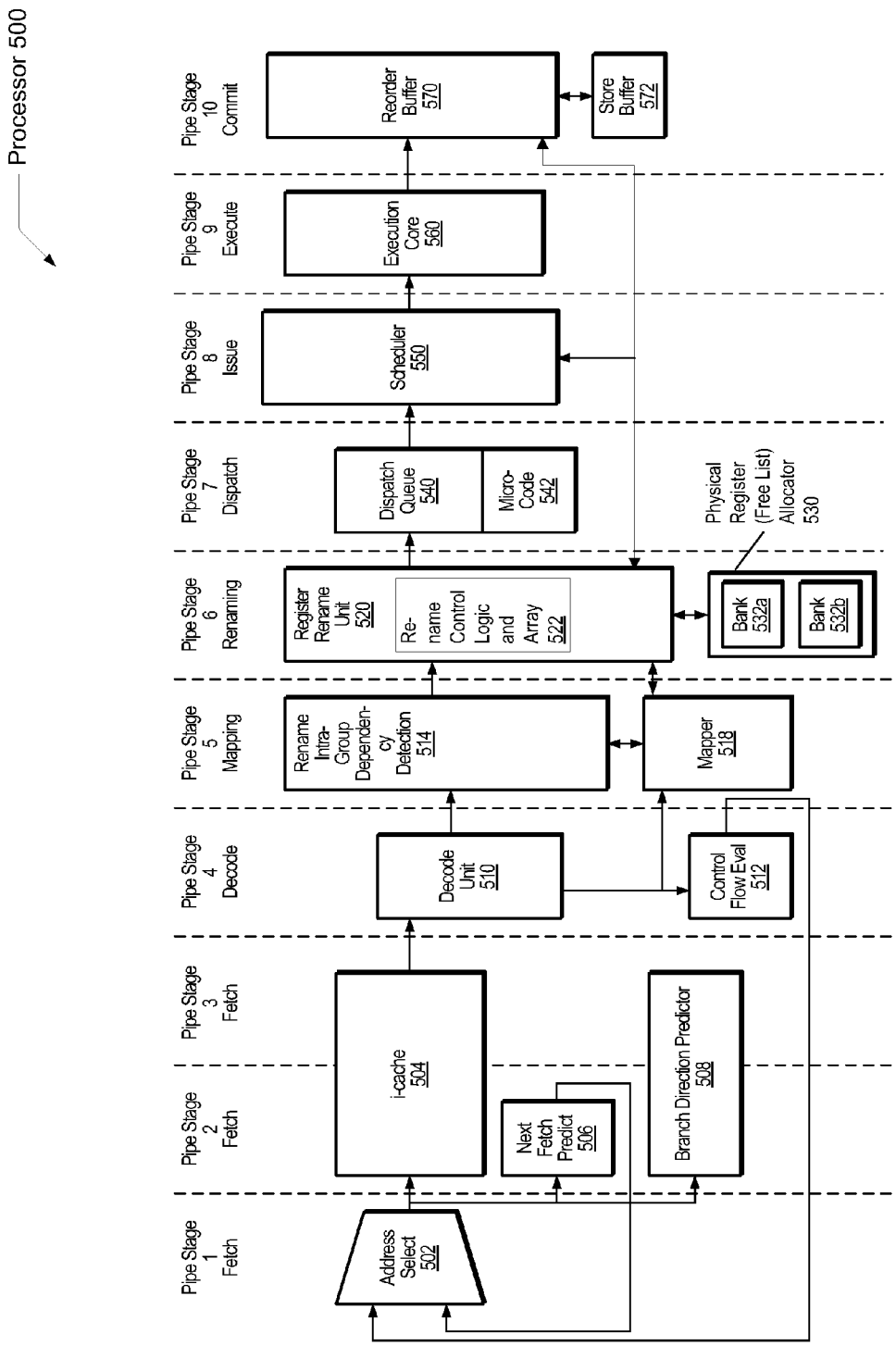
FIG. 5 is a generalized flow diagram of one embodiment of a processor core.

Referring now to FIG. 5, a generalized block diagram illustrating one embodiment of a processor core 500 that performs superscalar, out-of-order execution and register renaming with a partitioned free list is shown. The processor core 500 may utilize a multi-stage pipeline for processing of instructions. Although functional and control blocks are shown in a particular order and in a particular pipe stage, other combinations are possible and contemplated. In addition, the functional and control blocks may occupy more than one pipe stage. In most cases, a single pipe stage is shown for each functional block for ease of illustration.

An instruction-cache (i-cache) 504 may store instructions for a software application. One or more instructions indicated by an address conveyed by address select logic 502 may be fetched from the i-cache 504. Multiple instructions may be fetched from the i-cache 504 per clock cycle if there are no i-cache misses. The address may be incremented by a next fetch predictor 506. A branch direction predictor 508 may be coupled to each of the next fetch predictor 506 and the control flow evaluation logic 512 in a later pipeline stage. The predictor 508 may predict information of instructions that change the flow of an instruction stream from executing a next sequential instruction.

The decode unit 510 decodes the opcodes of the multiple fetched instructions. Alternatively, the instructions may be divided into micro-operations, or micro-ops. As used herein, the terms "instructions", "micro-ops", and "operations" are interchangeable as the invention may be used with an architecture that utilizes either implementation. In one embodiment, the control flow evaluation block 512 may alter fetch of instructions in the address selector 502. For example, an absolute address value associated with an unconditional branch opcode may be sent to the address selector 502.

Rename intra-group dependency detection logic 514 may find dependencies among instructions decoded by the decode unit 510. An intra-group of instructions may include decoded instructions from one or more clock cycles, or pipeline stages. Dependencies such as write-after-read (WAR), write-after-write (WAW) and read-after-write (RAW) may be detected. Dependency vectors that indicate dependencies between instructions may be generated. The dependency detection logic may include a store-to-load (STL) memory dependence predictor.

In addition to out-of-order issue of instructions to execution units within a superscalar microarchitecture, the processor core 112 may perform register renaming to increase throughput. Using hardware, the processor 500 may dynamically rename an architectural register identifier (AR ID) used for a destination operand. Source operands with a same architectural register identifier as the destination operand may be renamed with a same renamed register identifier used for the destination operand. The mapper 518 may divide instructions among distributed hardware resources using factors such as available concurrency, criticality of dependence chains, and communication penalties. When the hardware renames an architectural register identifier with a physical register identifier, the hardware stores the mapping in the mapper 518, which may be a data structure, such as a mapping table. As used herein, an identifier for either an architectural register or a physical register may also be referred to as a number. Therefore, an architectural register identifier may also be referred to as an architectural register number. Similarly, a physical register identifier may be referred to as a physical register number. The physical register number used to rename an architectural register number may also be referred to as a rename register number.

The register rename unit 520 may include rename control logic and array 522. The register rename unit 520 may determine which physical register identifiers to use to rename architectural register identifiers (AR IDs) used in both destination and source operands within instructions. The AR IDs are architecturally visible registers and they are associated with a given instruction set architecture (ISA). The ARM instruction set architecture may be selected for the given ISA. Alternatively, the Alpha, PowerPC, SPARC, MIPS, x86, or any other ISA may be selected. The register rename unit may select candidate physical register identifiers from the free list allocator 530 or a rename mapping table within the rename control logic 522. The free list allocator 530 may include multiple banks 532a-532b storing availability information for a given number of physical register identifiers (PR IDs). The steps described above for renaming 100, allocator 200, and methods 300 and 400 may be used for renaming received destination AR IDs within decoded instructions.

After instructions have been decoded and renamed, associated entries may be allocated in the dispatch queue 540. Instructions and associated renamed identifiers, program counter (PC) values, dependency vectors, markings for completion, and so forth may be sent to the dispatch queue 540 and later to the scheduler 550. Various exceptions may be detected, such as by the execution core 560. Examples include protection exceptions for memory accesses, no address translation, and so forth. The exceptions may cause a corresponding exception handling routine to be executed, such as by the microcode 542.

The scheduler 550 may schedule instructions for execution in the execution core 560. When operands are available and hardware resources are also available, an instruction may be issued out-of-order from the scheduler 550 to one of the functional units within the execution core 560. The scheduler 550 may read its source operands from the physical register file (not shown) after translating renamed identifiers with a mapping table or from operand bypass logic. The source operands may be provided to the execution core 560. The execution core 560 may resolve addresses for load and store instructions. In addition, the execution core 560 may perform one or more of multiple integer, floating-point, and Boolean operations.

The execution core 560 may include a load/store unit. The load/store unit may be connected to a data cache (not shown) and the store buffer 572 either directly or through the reorder buffer (rob) 570. The processor 500 may include a translation look-aside buffer (TLB) for each of the i-cache 504 and the data cache to avoid a cost of performing a full memory translation when performing a cache access. The store buffer 572 may store addresses corresponding to store instructions. The rob 570 may receive results from the execution core 560. In addition, results may be bypassed to previous pipeline stages for data forwarding to dependent instructions already in the pipeline. The rob 570 may ensure in-order commit and retirement of instructions.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor comprising:
 a plurality of physical registers, each identified by a physical register identifier (ID) of a plurality of physical register IDs;
 a plurality of architectural registers, each identified by an architectural register ID of a plurality of architectural register IDs;
 a register free list comprising a plurality of entries, wherein the register free list is partitioned into a plurality of banks and wherein each entry is configured to store an indication indicating whether a corresponding physical register ID is available to be assigned; and
 a register rename unit comprising circuitry configured to:
  assign physical register IDs to architectural register IDs based at least in part on a number of physical register IDs indicated as being available for assignment within each bank of the plurality of banks;
  receive a returning physical register ID that is currently indicated by the register free list as not available for assignment; and
  assign the returning physical register ID to a given architectural register ID without updating the register free list to indicate the returning physical register ID is available for assignment, in response to determining at least one bank of the plurality of banks has a number of available physical register identifiers that differs by at least a threshold amount from a number of available physical register identifiers within one or more other banks of the plurality of banks.

2. The processor as recited in claim 1, wherein when assigning a physical register ID to a given architectural register ID, a bank of the plurality of banks that does not have a lowest number of physical registers available for assignment has priority over a bank of the plurality of banks with a lowest number of physical register IDs available for assignment.

3. The processor as recited in claim 1, wherein when assigning a physical register ID to an architectural register ID, the register rename unit is further configured to give highest priority to a bank of the plurality of banks with a highest number of physical register IDs available for assignment.

4. The processor as recited in claim 1, wherein when assigning a physical register ID indicated as being available for assignment to an architectural register ID, the register rename unit is further configured to give lowest priority to a bank of the plurality of banks with a lowest number of physical register IDs indicated as being available for assignment.

5. The processor as recited in claim 1, wherein the circuitry in the register rename unit is configured to assign the returning physical register identifier to a destination architectural register identifier, in response to determining a number of available physical register identifiers from each one of the plurality of banks without a lowest number of available physical register identifiers is less than a number of destination architectural register identifiers to rename.

6. The processor as recited in claim 4, wherein the circuitry in the register rename unit is further configured to assign to a number of architectural register IDs of the plurality of architectural register IDs an equal number of physical register IDs from each one of the plurality of banks, in response to determining:
 the plurality of banks are balanced with physical register IDs indicated as being available for assignment; and
 a number of architectural register IDs to rename is an integer multiple of a number of the plurality of banks.

7. The processor as recited in claim 1, wherein for a given returning physical register ID that is currently indicated by the register free list as not available for assignment, the circuitry in the register rename unit is further configured to store and hold the given returning physical register ID for a number of clock cycles prior to being sent to a corresponding bank for updating associated availability information.

8. The processor as recited in claim 4, wherein in response to determining the plurality of banks are unbalanced, the circuitry in the register rename unit is further configured to stall updating the register free list with one or more returning physical register IDs.

9. The processor as recited in claim 8, wherein each of the plurality of banks within the register free list includes a single bit wide decoded vector, wherein each bit position within the decoded vector indicates whether an associated physical register ID is available to be assigned to an architectural register ID.

10. A method comprising:
 maintaining a plurality of physical registers, each identified by a physical register identifier (ID) of a plurality of physical register IDs;
 maintaining a plurality of architectural registers, each identified by an architectural register ID of a plurality of architectural register IDs;
 storing availability information in each entry of a plurality of entries within a register free list partitioned into a plurality of banks, wherein the availability information indicates whether a physical register ID is available to be assigned to an architectural register ID;
 assigning physical register IDs to architectural register IDs by selecting one or more banks of the plurality of banks based at least in part on a number of physical register IDs indicated as being available for assignment within each bank of the plurality of banks;
 receiving a returning physical register ID that is currently indicated by the register free list as not available for assignment; and
 assigning the returning physical register ID to a given architectural register ID without updating the register free list to indicate the returning physical register ID is available for assignment, in response to determining at least one bank of the plurality of banks has a number of available physical register identifiers that differs by at least a threshold amount from a number of available physical register identifiers within one or more other banks of the plurality of banks.

11. The method as recited in claim 10, wherein when assigning a physical register ID to a given architectural register ID, a bank of the plurality of banks that does not have a lowest number of physical registers available for assignment has priority over a bank of the plurality of banks with a lowest number of physical register IDs available for assignment.

12. The method as recited in claim 10, wherein when assigning a physical register ID to an architectural register ID, the method further comprises giving highest priority to a bank of the plurality of banks with a highest number of physical register IDs available for assignment.

13. The method as recited in claim 10, wherein when assigning a physical register ID to an architectural register ID, the method further comprises giving lowest priority to a bank of the plurality of banks with a lowest number of physical register IDs available for assignment.

14. The method as recited in claim 10, further comprising assigning the returning physical register identifier to a destination architectural register identifier, in response to determining a number of available physical register identifiers from each one of the plurality of banks without a lowest number of available physical register identifiers is less than a number of destination architectural register identifiers to rename.

15. The method as recited in claim 13, further comprising assigning to a number of architectural register IDs of the plurality of architectural register IDs an equal number of physical register IDs of the plurality from each one of the plurality of banks, in response to determining the following conditions:
- the plurality of banks are balanced with physical register IDs indicated as being available for assignment; and
- a number of architectural register IDs of the plurality of architectural register IDs to rename is an integer multiple of a number of the plurality of banks.

16. The method as recited in claim 10, wherein for a given returning physical register ID that is currently indicated by the register free list as not available for assignment, the method further comprises storing and holding the given returning physical register ID for a number of clock cycles prior to being sent to a corresponding bank for updating associated availability information.

17. A register rename unit comprising:
a register free list comprising a plurality of entries, wherein the register free list is partitioned into a plurality of banks and wherein each entry is configured to store an indication indicating whether a corresponding physical register identifier (ID) is available to be assigned;
a storage element configured to store a returning physical register ID that is available for assignment but not yet indicated in the register free list as available for assignment;
control logic comprising circuitry configured to:
detect the returning physical register ID that is currently indicated by the register free list as not available for assignment; and
assign the returning physical register ID to a given architectural register ID without updating the register free list to indicate the returning physical register ID is available for assignment, in response to determining at least one bank of the plurality of banks has a number of available physical register identifiers that differs by at least a threshold amount from a number of available physical register identifiers within one or more other banks of the plurality of banks.

18. The register rename unit as recited in claim 17, wherein when assigning a physical register ID to an architectural register ID from the register free list, highest priority is given to a bank of the plurality of banks with a highest number of physical register IDs indicated as being available for assignment.

19. A non-transitory computer readable storage medium comprising program instructions to rename instruction operands, wherein the program instructions are executable to:
maintain a register free list comprising a plurality of entries, wherein the register free list is partitioned into a plurality of banks and wherein each entry is configured to indicate whether a corresponding physical register identifier (ID) is available to be assigned;
receive a returning physical register ID that is available for assignment but not yet indicated in the register free list as available for assignment; and
assign the returning physical register ID to a given architectural register ID without updating the register free list to indicate the returning physical register ID is available for assignment, in response to determining at least one bank of the plurality of banks has a number of available physical register identifiers that differs by at least a threshold amount from a number of available physical register identifiers within one or more other banks of the plurality of banks.

20. The non-transitory computer readable storage medium as recited in claim 19, wherein the program instructions are executable to assign the returning physical register identifier to a destination architectural register identifier, in response to determining a number of available physical register identifiers from each one of the plurality of banks without a lowest number of available physical register identifiers is less than a number of destination architectural register identifiers to rename.

* * * * *